(12) United States Patent
Hu

(10) Patent No.: US 8,340,704 B2
(45) Date of Patent: Dec. 25, 2012

(54) RESOURCE ALLOCATION METHOD AND APPARATUS FOR MULTI-MODE TERMINAL

(75) Inventor: Shuhui Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/543,519

(22) Filed: Jul. 6, 2012

(65) Prior Publication Data

US 2012/0270551 A1 Oct. 25, 2012

Related U.S. Application Data

(63) Continuation of application No. PCT/CN2011/070128, filed on Jan. 10, 2011.

(30) Foreign Application Priority Data

Jan. 8, 2010 (CN) .......................... 2010 1 0003161

(51) Int. Cl.
  *H04B 7/00* (2006.01)
(52) U.S. Cl. ........ 455/509; 455/450; 455/436; 455/453; 455/552.1
(58) Field of Classification Search .................. 455/509, 455/450, 452, 453, 552.1; 370/281, 329, 370/338, 467, 478
See application file for complete search history.

(56) References Cited

U.S. PATENT DOCUMENTS

2009/0196180 A1* 8/2009 Bahl et al. ...................... 370/235
2010/0317357 A1* 12/2010 Miki et al. ..................... 455/450

FOREIGN PATENT DOCUMENTS

| CN | 1275296 A | 11/2000 |
|---|---|---|
| CN | 101257370 A | 9/2008 |
| CN | 101286808 | 10/2008 |
| JP | 2009118015 A | 5/2009 |

OTHER PUBLICATIONS

International Search Report and Translation received in Patent Cooperation Treaty Application No. PCT/CN2011/070128, mailed Mar. 31, 2011, 4 pages.
Written Opinion of the International Searching Authority and Translation received in Patent Cooperation Treaty Application No. PCT/CN2011/070128, mailed Mar. 31, 2011, 4 pages.

\* cited by examiner

*Primary Examiner* — Kamran Afshar
*Assistant Examiner* — Manpreet Matharu
(74) *Attorney, Agent, or Firm* — Slater & Matsil, L.L.P.

(57) ABSTRACT

In a resource allocation method for a multi-mode terminal, a control network element of a first network technology type obtains information about a radio resource of a second network technology type. The radio resource of the second network technology type is used by the multi-mode terminal and the information about the radio resource of the second network technology type indicates a carrier frequency. The control network element of the first network technology type determines that a carrier frequency allocated to the multi-mode terminal serves as a radio resource of the first network technology type according to the carrier frequency indicated by the information of the radio resource of the second network technology type and according to a maximum spectral width between a service of the first network technology type and a service of the second network technology type.

18 Claims, 11 Drawing Sheets

RESOURCE ALLOCATION METHOD AND APPARATUS FOR MULTI-MODE TERMINAL

CROSS-REFERENCE TO RELATED APPLICATIONS

This application is a continuation of International Application No. PCT/CN2011/070128, filed on Jan. 10, 2011, which claims priority to Chinese Patent Application No. 201010003161.8, filed on Jan. 8, 2010, both of which are hereby incorporated by reference in their entireties.

FIELD OF THE INVENTION

The embodiments of the present invention relate to radio communications technologies, and in particular, to a resource allocation method and apparatus for a multi-mode terminal.

BACKGROUND OF THE INVENTION

With the development of mobile communications technologies, a multi-mode terminal emerges. A multi-mode terminal is compatible with multiple network technology types, so that a user can enjoy more services. Services of different network technology types, which are obtained by a multi-mode terminal, are provided respectively by network element of different network technology types at a network side. When a service of a certain network technology type is realized, a corresponding network element allocates a radio resource for the terminal for corresponding control and data transmission, thereby completing a service of a corresponding network technology type. A multi-mode terminal not only can complete services of different network technology types, but also can realize concurrent services, that is, realize services of more than two different network technology types at the same time.

However, the prior art has the following disadvantages: After a network element of one network technology type allocates a radio resource for the multi-mode terminal for a service of its corresponding network technology type, radio resources for services of other network technology types are unavailable, thereby restricting realization of concurrent services and causing that reliability for implementing concurrent services of the multi-mode terminal is reduced.

SUMMARY OF THE INVENTION

A resource allocation method and apparatus for a multi-mode terminal are provided in embodiments of the present invention to improve reliability for realizing concurrent services of the multi-mode terminal.

An embodiment of the present invention provides a resource allocation method for a multi-mode terminal, where the method includes:

obtaining, by a control network element of a first network technology type, information about a radio resource of a second network technology type, where the radio resource of the second network technology type is used by the multi-mode terminal, and the information about the radio resource of the second network technology type indicates a carrier frequency; and according to the carrier frequency indicated by the information about the radio resource of the second network technology type and according to an obtained maximum spectral width between a service of the first network technology type and a service of the second network technology type, determining, by the control network element of the first network technology type, that a carrier frequency allocated to the multi-mode terminal serves as a radio resource of the first network technology type, where a difference value between a carrier frequency of the radio resource of the first network technology type and the carrier frequency indicated by the radio resource information of the second network technology type is within a range of the maximum spectral width.

An embodiment of the present invention further provides a resource allocation apparatus for a multi-mode terminal, where the apparatus includes:

a radio resource information obtaining module, configured to obtain information about a radio resource of a second network technology type, where the radio resource of the second network technology type is used by the multi-mode terminal, and the information about the radio resource of the second network technology type indicates a carrier frequency; and a radio resource allocation determining module, configured to: according to the carrier frequency indicated by the information about the radio resource of the second network technology type and according to an obtained maximum spectral width between a service of the first network technology type and a service of the second network technology type, determine that a carrier frequency allocated to the multi-mode terminal serves as a radio resource of the first network technology type, where a difference value between a carrier frequency of the radio resource of the first network technology type and the carrier frequency indicated by the information about the radio resource of the second network technology type is within a range of the maximum spectral width.

By using the preceding technical solutions, relevance among various network technology types is established when a system at a network side allocates a radio resource for a multi-mode terminal, so that failures of concurrent services, which are caused by a radio resource conflict, can be avoided, and therefore, reliability for realizing the concurrent services can be improved.

DETAILED DESCRIPTION OF THE EMBODIMENTS

To make the objectives, technical solutions, and advantages of the embodiments of the present invention clearer, the technical solutions in the embodiments of the present invention are clearly and completely described with reference to the accompanying drawings in the embodiments of the present invention. Evidently, the embodiments to be described are only a part rather than all of the embodiments of the present invention. Based on the embodiments of the present invention, all other embodiments made by those skilled in the art without creative efforts fall within the protection scope of the present invention.

Embodiment 1

Figure 1:
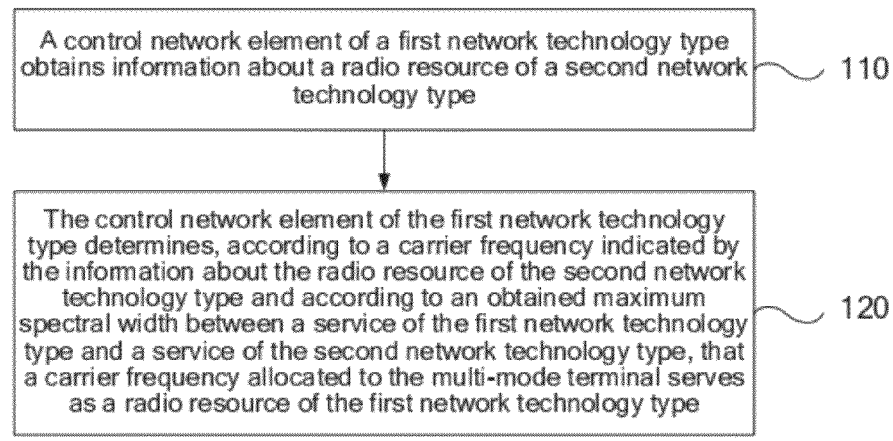
FIG. 1 is a flowchart of a resource allocation method for a multi-mode terminal according to a first embodiment of the present invention.

FIG. 1 is a flowchart of a resource allocation method for a multi-mode terminal according to a first embodiment of the present invention. The method includes the following steps:

Step 110: A control network element of a first network technology type obtains information about a radio resource of a second network technology type, where the radio resource of the second network technology type is used by the multi-mode terminal.

In step 110, it may specifically be: When the control network element of the first network technology type identifies a trigger condition for allocating a radio resource of the first network technology type for a service of the first network technology type of the multi-mode terminal, obtain information about the radio resource of the second network technology type, where the radio resource of the second network technology type is allocated to the service of the second network technology type and currently used by the multi-mode terminal.

Step 120: The control network element of the first network technology type determines, according to the information about the radio resource of the second network technology type, a radio resource of the first network technology type, where the radio resource of the first network technology type is allocated to the multi-mode terminal.

In step 120, it may specifically be: The control network element of the first network technology type determines, according to a carrier frequency indicated by the information about the radio resource of the second network technology type and according to an obtained maximum spectral width between a service of the first network technology type and a service of the second network technology type, that a carrier frequency allocated to the multi-mode terminal serves as a radio resource of the first network technology type, where a difference value between the carrier frequency of the radio resource of the first network technology type and the carrier frequency indicated by the information about the radio resource of the second network technology type is within a range of the maximum spectral width.

In this embodiment, the first network technology type and the second network technology type are used to distinguish two different network technology types. In an actual application, types of network technologies are not limited to two types, and may have more than two types, which are all applicable to the technical solutions in the embodiments.

In an actual application, a conflict among radio resources used by the multi-mode terminal for services of different network technology types may involve multiple aspects. For the sake of clarity, in subsequent embodiments, a conflict among carriers that are typical radio resources is taken as an example for description.

A reason why a conflict exists among carriers is as follows: During realization of concurrent services, the multi-mode terminal needs to bear different services by using different carriers. In other words, services of two network technology types cannot be deployed in the same carrier; due to a restriction on radio frequency hardware of the multi-mode terminal, during realization of the concurrent services, carrier frequencies of services of different network technology types are required to be within a certain spectral range. This spectral range may be called maximum spectral width (MaxSupportedBW); and when a difference between carrier frequencies of services of two network technology types exceeds the maximum spectral width, that is, a conflict among carriers is generated, at this time, one service may be stopped according to a rule, and only the other service is supported, which may also cause failures of two types of services at the same time.

For this case where a conflict exists among carriers, the information about the radio resource of the second network technology type in this embodiment specifically indicates a carrier frequency, and may be a carrier frequency number, where the carrier frequency number may be an identity that can uniquely indicate a carrier frequency, and may also be the carrier frequency itself. Determining, by the control network element of the first network technology type, according to the information about the radio resource of the second network technology type, a radio resource of the first network technology type, where the radio resource of the first network technology type is allocated to the multi-mode terminal, may include:

The control network element of the first network technology type determines, according to a carrier frequency indicated by the carrier frequency number, and according to an obtained maximum spectral width between a service of the first network technology type and a service of the second network technology type, that a carrier frequency allocated to the multi-mode terminal serves as a radio resource of the first network technology type, where a difference value between a carrier frequency of the radio resource of the first network technology type and the carrier frequency indicated by the information about the radio resource of the second network technology type is within a range of the maximum spectral width. The maximum spectral width may be provided by a mobile terminal for a control network element, and may also be obtained by the control network element by querying user information at a network side. In a resource allocation method during a handover process, a radio resource of the first network technology type and a radio resource of the second network technology type are carriers respectively. Then, when the control network element of the first network technology type sends a handover request message or a prehandover request, the maximum spectral width may further be included in the handover request message or the pre-handover request and provided for a control network element of a first network technology type at a destination side.

In this embodiment, a trigger condition for allocating the radio resource of the first network technology type for the service of the first network technology type of the multi-mode terminal may be any case where a radio resource need to be allocated for the multi-mode terminal, for example:

when the control network element of the first network technology type receives a request for establishing a service of the first network technology type, where the request for establishing a service of the first network technology type is initiated by the multi-mode terminal, it identifies a trigger condition for allocating the radio resource of the first network technology type for the service of the first network technology type of the multi-mode terminal; or when the control network element of the first network technology type initiates establishment of the service of the first network technology type of the multi-mode terminal, it identifies a trigger condition for allocating the radio resource of the first network technology type for the service of the first network technology type of the multi-mode terminal; or when the control network element of the first network technology type receives a handover request message for the multi-mode terminal, it identifies a trigger condition for allocating the radio resource of the first network technology type for the service of the first network technology type of the multi-mode terminal. The handover request message is a message transmitted during initiation of a cell handover. In different system networks, different corresponding message names are used. For example, in a data only (Data Only, DO for short) network, a session transfer request message is used as a handover request message.

During a resource allocation process of the cell handover, when the handover request message is used as a trigger condition, it may be an operation executed by the control network element of the first network technology type at the destination side after handover for obtaining information about the radio resource of the second network technology type. Alternatively, it may also be: A control network element of a first network technology type at a source side before handover obtains information about the radio resource of the second network technology type, the control network element of the first network technology type at the destination side obtains information about the radio resource of the first network technology type from the control network element of the first network technology type at the source side, that is, obtaining, by the control network element of the first network technology type, information about the radio resource of the second network technology type, where the radio resource of the second network technology type is used by the multi-mode terminal includes:

receiving, by the control network element of the first network technology type at the destination side, from the control network element of the first network technology type at the source side, information about the radio resource of the second network technology type, where the information about the radio resource of the second network technology type is set in a handover request message or a pre-handover request.

Before allocating a radio resource for the multi-mode terminal, the control network element first obtains information about a radio resource that is allocated for a service of another network technology type and currently used by the multi-mode terminal. The information about the radio resource is information that can indicate a radio resource characteristic. Specific forms of obtaining, by the control network element of the first network technology type, information about a radio resource of the second network technology type, where the radio resource of the second network technology type is allocated for the service of the second network technology type and currently used by the multi-mode terminal, may include but are not limited to the following three types, where a first specific form includes:

sending, by the control network element of the first network technology type, a query request for a radio resource of the second network technology type to the multi-mode terminal; and receiving, by the control network element of the first network technology type, a query response for the radio resource of the second network technology type, where the query response for the radio resource of the second network technology type is sent by the multi-mode terminal and includes information about the radio resource of the second network technology type, where the radio resource of the second network technology type is allocated to the service of the second network technology type and currently used by the multi-mode terminal.

The second specific form may include:

obtaining, by the control network element of the first network technology type, from current radio resource information sent by the multi-mode terminal, information about the radio resource of the second network technology type through parsing, where the radio resource of the second network technology type is allocated to the service of the second network technology type and currently used by the multi-mode terminal; and sending, by the multi-mode terminal, the current radio resource information may be: Reporting information about a currently used radio resource to a control element of another network technology type supported by itself is triggered when the multi-mode terminal starts to execute a service of a certain network technology type. For example, reporting is performed when the multi-mode terminal establishes the service of the first network technology type.

The third specific form may include:

sending, by the control network element of the first network technology type, a query request for a radio resource of the second network technology type to a control network element of the second network technology type, where the query request for the radio resource of the second network technology type includes an identity of the multi-mode terminal; and receiving, by the control network element of the first network technology type, a query response for the radio resource of the second network technology type, where the query response for the radio resource of the second network technology type is sent by the control network element of the second network technology type and includes information about the radio resource of the second network technology type, where the radio resource of the second network technology type is allocated to the service of the second network technology type and currently used by the multi-mode terminal.

In the third specific form, methods for determining, by the control network element of the first network technology type, to which control network element of the second network technology type the query request is send include the following: (1) The control network element of the first network technology type determines a control network element of the second network technology type according to a fixed corresponding relationship, for example, when the control network element of the first network technology type and the control network element of the second network technology type are deployed on the same physical device, the corresponding relationship is a fixed relationship; (2) The control network element of the first network technology type obtains a control network element of the second network technology type according to a pre-configured corresponding relationship, for example, a corresponding relationship between the control network element of the first network technology type and the control network element of the second network technology type may be pre-configured on the control network element of the first network technology type; and (3) The control network element of the first network technology type obtains, according to information about a current geographical area where the multi-mode terminal is located and a pre-configured corresponding relationship between a geographical area and a control network element of the second network technology type, the control network element of the second network technology type, where geographical area information may include information about a base station, sector, or carrier frequency where the multi-mode terminal is currently located.

Then, the control network element determines, according to a radio resource currently used by the multi-mode terminal, how to allocate radio resources for a service of a network technology type in a system, so as to avoid that a newly allocated radio resource cannot be used due to a conflict between the newly allocated radio resource and the radio resource that is currently used by the multi-mode terminal.

By using the preceding technical solution, relevance among various network technology types is established when a system at a network side allocates a radio resource for a multi-mode terminal, so that failures of concurrent services, which are caused by a radio resource conflict, can be avoided, and therefore, reliability for realizing the concurrent services can be improved.

In the following embodiment, further, 1X in the code division multiple access (Code Division Multiple Access, CDMA for short) field is used as a first network technology type and DO as a second network technology type for description. Definitely, the technical solutions of the present invention are not limited to these two network technology types, and may similarly apply to multi-mode terminals formed by other various network technology types, for example a 1X and long term evolution (Long Term Evolution, LTE for short) multi-mode terminal, a global system for mobile communications (Global System for Mobile Communications, GSM for short) and UMTS multi-mode terminal, a universal mobile telecommunications system (Universal Mobile Telecommunications System, UMTS for short) and LTE multi-mode terminal, a GSM and LTE multi-mode terminal, a time division-synchronous code division multiple access (Time Division-Synchronous Code Division Multiple Access, TDS-CDMA for short) and LTE multi-mode terminal, a UMTS and high speed downlink packet access (High Speed Downlink Packet Access, HSPA for short) multi-mode terminal, and a DO and LTE multi-mode terminal.

Embodiment 2

Figure 2:
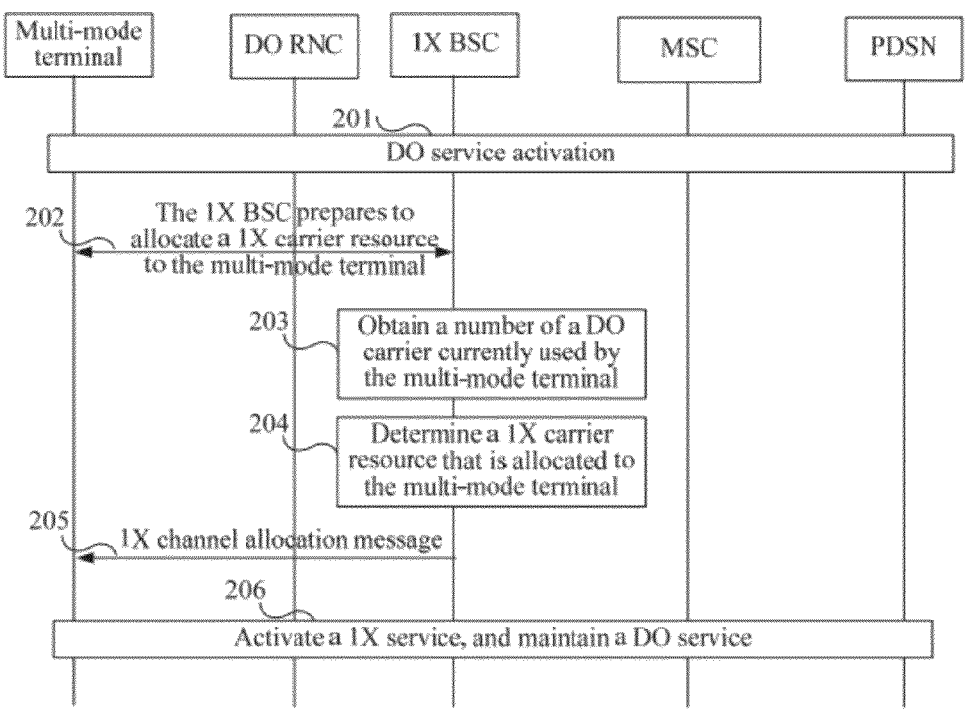
FIG. 2 is a signaling flowchart of a resource allocation method for a multi-mode terminal according to a second embodiment of the present invention.
Figure 3:
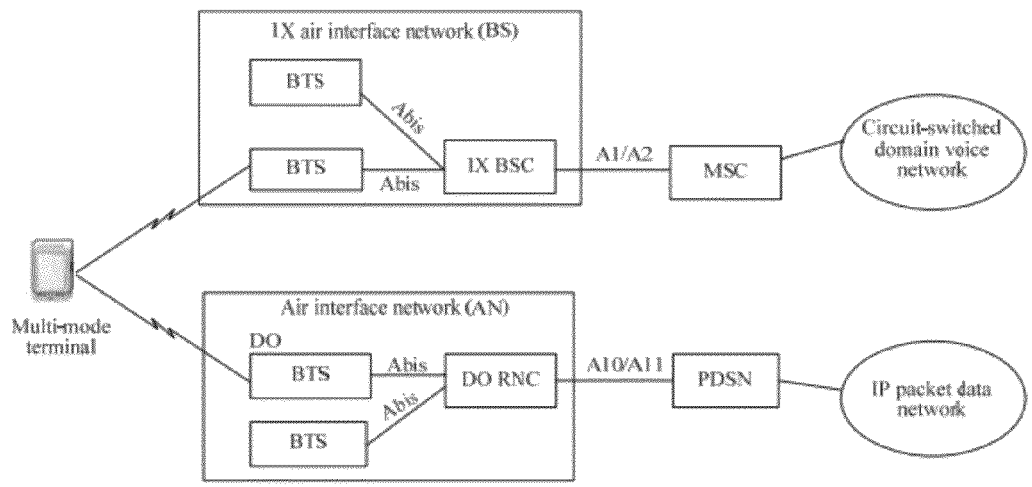
FIG. 3 is a schematic diagram of a network architecture on which the second embodiment is based.

FIG. 2 is a signaling flowchart of a resource allocation method for a multi-mode terminal according to a second embodiment of the present invention. In this embodiment, 1X is used as a first network technology type and is mainly used to provide circuit-switched domain voice services, such as a voice call, a short message, and so on; and DO is used as a second network technology type and is mainly used to provide data services, such as web page browsing, file transfer protocol (File Transfer Protocol, FTP for short) downloading, and so on. FIG. 3 is a schematic diagram of a network architecture on which the second embodiment is based. As shown in FIG. 3, a CDMA air interface radio network is formed by a 1X air interface network and a DO air interface network. The 1X air interface network realizes a 1X air interface standard, and is responsible for providing a 1X air interface service for a multi-mode terminal. The 1X air interface network is formed by a base transceiver station (Base Transceiver Station, BTS for short) and a base station controller (Base Station Controller, BSC for short), is also called base station (Base Station, BS for short), and is connected to a circuit-switched domain voice network through a mobile switch center (Mobile Switch Center, MSC for short). The DO air interface network realizes a DO air interface standard, and is responsible for providing a DO air interface service for the multi-mode terminal. The DO air interface network is formed by a BTS and a DO radio network controller (Radio Network Controller, RNC for short), is also called access network (Access Network, AN for short), and is connected to an IP packet data network through a packet data service node (Packet Data Service Node, PDSN for short). Functions of each network element are as follows:

A 1X BSC is responsible for controlling one or multiple BTSs, is responsible for management of a 1X radio resource on an air interface of the BTS, a handover and call control of a terminal, and so on, and is responsible for accessing the terminal to a circuit network;

A DO RNC is responsible for controlling one or multiple BTSs, is responsible for management of a DO radio resource on an air interface of the BTS, a handover and call control of a terminal, and so on, and is responsible for accessing the terminal to an IP packet data network;

A BTS is controlled by a BSC or an RNC, and is responsible for transmitting and receiving a radio signal on an air interface. The BTS may be divided into multiple sectors according to its coverage area. Carriers among different sectors may be multiplexed. Carriers in the same sector, however, cannot be multiplexed. BTSs of 1X and DO air interface networks may be separately deployed, or may also share the same BTS physical entity, that is, 1X and DO services are deployed on one BTS at the same time.

A BS, or to be more specific, a BSC may be regarded as a first control network element, and an AN, or to be more specific, an RNC may be regarded as a second control network element. A multi-mode terminal that supports concurrency may access a 1X air interface network and a DO air interface network simultaneously to perform a related service. For example, a user may use a multi-mode terminal to perform FTP service downloading of DO at the same time when using the multi-mode terminal to perform a 1X voice telephone service. According to an existing CDMA technology, 1X and DO services may generally be borne by using carriers of a 1.25 MHz width. When an operator deploys air interface standards of network technology types such as 1X and DO at the same time in one geographical area, 1X and DO services must bear their respective services by using independent carriers. In other words, 1X and DO cannot be deployed in one carrier at the same time.

Figure 4:
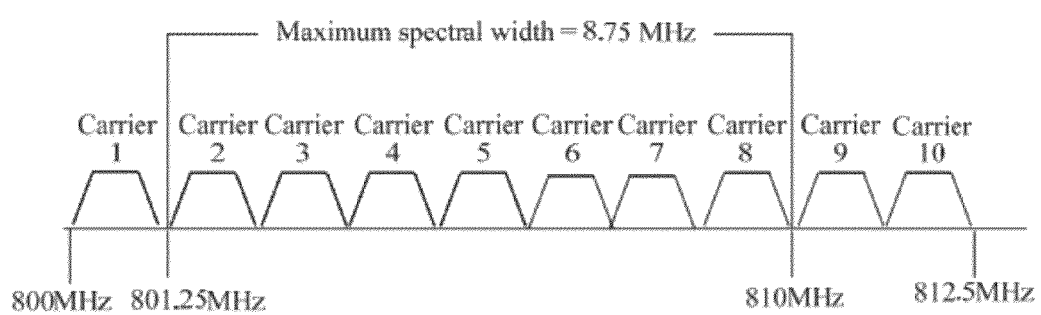
FIG. 4 is a schematic diagram of a carrier resource according to an embodiment of the present invention.

Due to a restriction on radio frequency hardware of a concurrent multi-mode terminal, when concurrent 1X and DO services are performed, it is required that a difference between a carrier frequency of a 1X service and a carrier frequency of a DO service be within a certain spectral range. For example, concurrent 1X and DO services can be performed only when a difference between a carrier frequency of a 1X service and a carrier frequency of a DO service is within 8.75 MHz. Here, 8.75 MHz is a maximum concurrent spectral width for the 1X and DO services that are supported by the multi-mode terminal. As shown in FIG. 4, it is assumed that an operator deploys a CDMA service in 800 MHz to 812.5 MHz in a certain area, where carriers numbered 1 to 5 are deployed with a 1X service, and carriers numbered 6 to 10 are deployed with a DO service. It is assumed that a maximum spectral width for concurrent 1X and DO services that are supported by the multi-mode terminal is 8.75 MHz. Then, the terminal may perform a 1X service and a DO service in a carrier 2 and a carrier 8 respectively at the same time, and may also perform a 1X service and a DO service in a carrier 5 and a carrier 6 respectively at the same time. However, the terminal cannot perform a 1X service and a DO service in the carrier 2 and a carrier 9 at the same time. When the difference between the carrier frequency of the 1X service and the carrier frequency of the DO service is not within the maximum spectral width range, the multi-mode terminal cannot perform the concurrent 1X and DO services, but can perform one of the 1X service and DO service.

Based on the preceding specific application cases, this embodiment is specifically a case where a multi-mode terminal initiates a 1X service at the same time when executing a DO service, to perform resource allocation. It is assumed that an operator deploys 10 carriers, carriers 1 to 5 are 1X carriers, carriers 6 to 10 are DO carriers, and a maximum spectral width supported by a multi-mode terminal is 8.75 MHz. As shown in FIG. 2, the method in this embodiment includes the following steps:

Step 201: A multi-mode terminal currently executes a DO service on a carrier 8 on a DO RNC, that is, it is in a DO service active state. At the same time, the multi-mode terminal may perform a 1X service in a 1X air interface network, and may also not execute a 1X service.

Step 202: A 1X BSC identifies a trigger condition for allocating a 1X carrier resource for the 1X service of the multi-mode terminal, that is, prepares to allocate a 1X carrier resource to the multi-mode terminal. This trigger condition may be that the multi-mode terminal actively initiates a request for establishing a 1X service to the 1X BSC, or the 1X BSC actively initiates 1X service establishment.

Step 203: The 1X BSC obtains information about a DO carrier resource that is allocated to the DO service and currently used by the multi-mode terminal, that is, obtains a number of a DO carrier currently used by the multi-mode terminal.

The 1X BSC may obtain a number of a currently used DO carrier of the multi-mode terminal by transmitting an air interface message with the multi-mode terminal. A manner for transmitting the air interface message may be that the 1X BSC sends a query request for a radio resource of a second network technology type to the multi-mode terminal to query information about the currently used DO carrier, and the multi-mode terminal returns a query response for the radio resource of the second network technology type to the 1X BSC, where the number of the DO carrier currently used by the multi-mode terminal is included;

or, it may also be that the multi-mode terminal actively reports current radio resource information to the 1X BSC, where the current radio resource information carries information about the currently used DO carrier;

or, the 1X BSC may send a query request for a radio resource of a second network technology type to the DO RNC according to a unique identity of the multi-mode terminal, such as an international mobile subscriber identifier (International Mobile Subscriber Identifier, IMSI for short), and receive a query response for the radio resource of the second network technology type, where the query response for the radio resource of the second network technology type is returned by the DOR RNC, and includes the number of the DO carrier currently used by the multi-mode terminal.

Step 204: After obtaining the number of the DO carrier currently used by the multi-mode terminal, the 1X BSC determines, according to the number of the DO carrier and a maximum spectral width, a 1X carrier resource that is to be allocated to the multi-mode terminal. Specifically, the 1X BSC needs to ensure that a difference between a carrier frequency indicated by a number of a selected 1X carrier and a carrier frequency indicated by the number of the DO carrier currently used by the multi-mode terminal is within a range of the maximum spectral width. Based on this condition, a 1X carrier may be selected at random or according to a set rule. It is assumed that the 1X BSC selects to allocate a 1X radio resource on a carrier 3.

Step 205: The 1X BSC delivers a 1X channel allocation message to the multi-mode terminal, where the message carries a radio resource allocated on the carrier 3.

Step 206: After the multi-mode terminal receives the 1X channel allocation message, because an allocated 1X carrier and the currently used DO carrier are within the range of the maximum spectral width, concurrent 1X and DO services may be performed, where the multi-mode terminal performs 1X service activation while maintaining the DO service, thereby realizing concurrent services.

In the technical solution in this embodiment, DO carrier information is considered in step 204 before a 1X carrier radio resource is allocated, so that a case where a difference between a frequency of a 1X carrier and a frequency of a DO carrier exceeds the maximum spectral width can be avoided, thereby avoiding a case where the multi-mode terminal performs 1X service activation according to a set rule, for example, according to a voice service priority rule, and interrupts the DO service at the same time, and finally avoiding failures of concurrent services.

Therefore, with the technical solution in this embodiment, radio resource relevance between services of different network technology types is established in a resource allocation process, and for a multi-mode terminal that supports 1X and DO concurrency, interruption of a 1X service or a DO service cannot be caused by 1X resource allocation. Therefore, a resource conflict can be avoided, and probability for realizing concurrent services of the multi-mode terminal can be improved.

Embodiment 3

Figure 5:
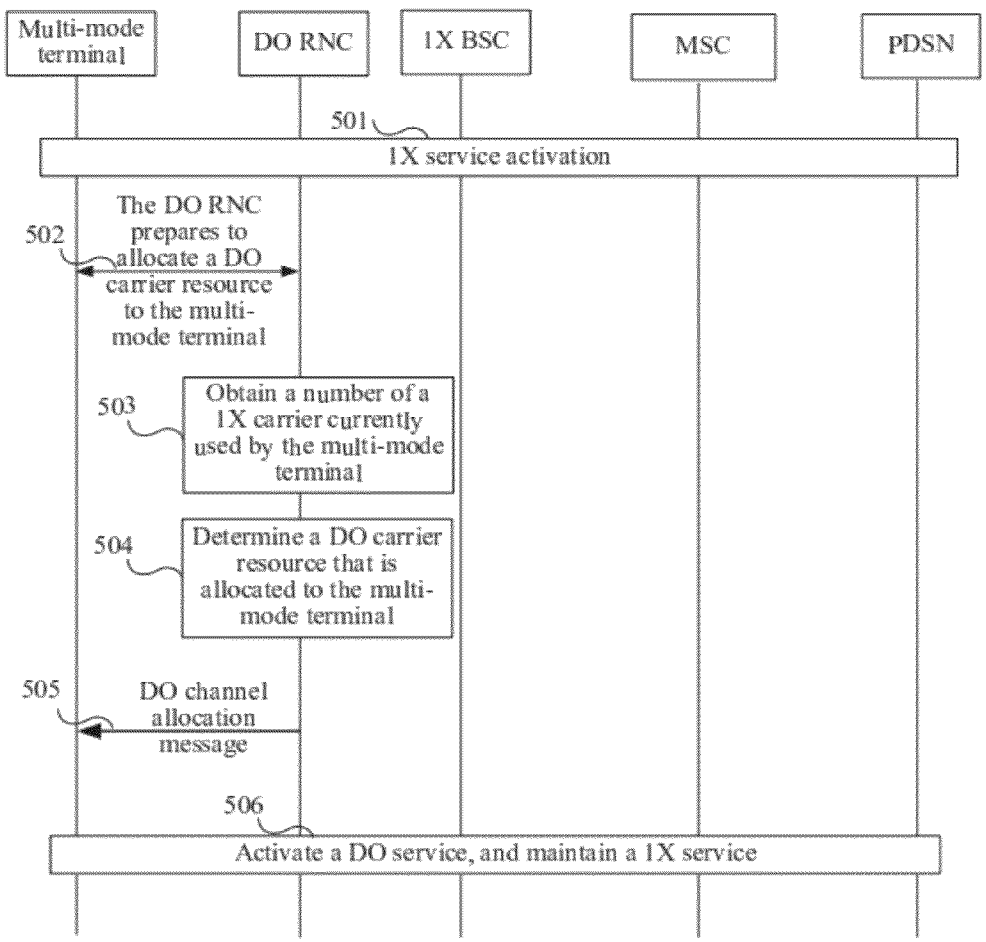
FIG. 5 is a signaling flowchart of a resource allocation method for a multi-mode terminal according to a third embodiment of the present invention.

FIG. 5 is a signaling flowchart of a resource allocation method for a multi-mode terminal according to a third embodiment of the present invention. In this embodiment, services provided by 1X and DO that are proposed in the second embodiment are still taken as an example, specifically, which is a case where a DO RNC allocates a DO radio resource. The following steps are included:

Step 501: A multi-mode terminal currently executes a 1X service on a carrier 1 in a 1X BSC, that is, it is in a 1X service active state. At the same time, the multi-mode terminal may perform a DO service in a DO air interface network, and may also not execute a DO service.

Step 502: The DO RNC identifies a trigger condition for allocating a DO carrier resource for the DO service of the multi-mode terminal, that is, prepares to allocate a DO carrier resource to the multi-mode terminal. This trigger condition may be that the multi-mode terminal actively initiates a request for establishing a DO service to the DO RNC, or the DO RNC actively initiates DO service establishment.

Step 503: The DO RNC obtains information about a 1X carrier resource that is allocated to the 1X service and currently used by the multi-mode terminal, that is, obtains a number of a 1X carrier currently used by the multi-mode terminal. Being similar to the preceding embodiment, the DO RNC may obtain the number of the 1X carrier in multiple manners.

The DO RNC obtains the number of the 1X carrier by transmitting an air interface message with the multi-mode terminal. A manner for transmitting the air interface message may include: The DO RNC sends a query request for a radio resource of a second network technology type to the multi-mode terminal to query information about a 1X carrier currently used by the multi-mode terminal, and the multi-mode terminal returns a query response for the radio resource of the second network technology type to the DO RNC, where the number of the 1X carrier currently used by the multi-mode terminal is included;

or, it may also be that the multi-mode terminal actively reports current radio resource information to the DO RNC, where the current radio resource information carries information about the 1X carrier currently used by the multi-mode terminal;

or, the DO RNC may send a query request for a radio resource of a second network technology type to the 1X BSC according to a unique identity of the multi-mode terminal, and receive a query response for the radio resource of the second network technology type, where the query response for the radio resource of the second network technology type is returned by the 1X BSC, and includes the number of the 1X carrier currently used by the multi-mode terminal.

Step 504: After obtaining the number of the 1X carrier currently used by the multi-mode terminal, the DO RNC determines, according to the number of the 1X carrier and a maximum spectral width, a DO carrier resource that is to be allocated to the multi-mode terminal The DO RNC needs to ensure that a difference between a carrier frequency indicated by a number of a selected DO carrier and a carrier frequency indicated by the number of the 1X carrier currently used by the multi-mode terminal is within a range of the maximum spectral width. Based on this condition, a DO carrier may be selected at random or according to a set rule. It is assumed that the DO RNC selects to allocate a DO radio resource on a carrier 6.

Step 505: The DO RNC delivers a DO channel allocation message to the multi-mode terminal, where the message carries a radio resource allocated on the carrier 6.

Step 506: After the multi-mode terminal receives the DO channel allocation message, because an allocated DO carrier and the currently used 1X carrier are within the range of the maximum spectral width, concurrent 1X and DO services may be performed. The multi-mode terminal performs DO service activation while maintaining the 1X service, thereby realizing concurrent services.

In the technical solution in this embodiment, 1X carrier information is considered in step 504 before a DO carrier radio resource is allocated, so that a case where a difference between a frequency of a 1X carrier and a frequency of a DO carrier exceeds the maximum spectral width can be avoided, thereby avoiding a case where the multi-mode terminal maintains the 1X service according to a set rule, for example, according to a voice service priority rule, and interrupts a channel allocation process of the DO service at the same time, and finally avoiding failures of concurrent services.

Therefore, with the technical solution in this embodiment, radio resource relevance between services of different network technology types is established in a resource allocation process, and for a multi-mode terminal that supports 1X and DO concurrency, interruption of a 1X service or a DO service cannot be caused by DO resource allocation. Therefore, a resource conflict can be avoided, and probability for realizing concurrent services of the multi-mode terminal can be improved.

Embodiment 4

Figure 6:
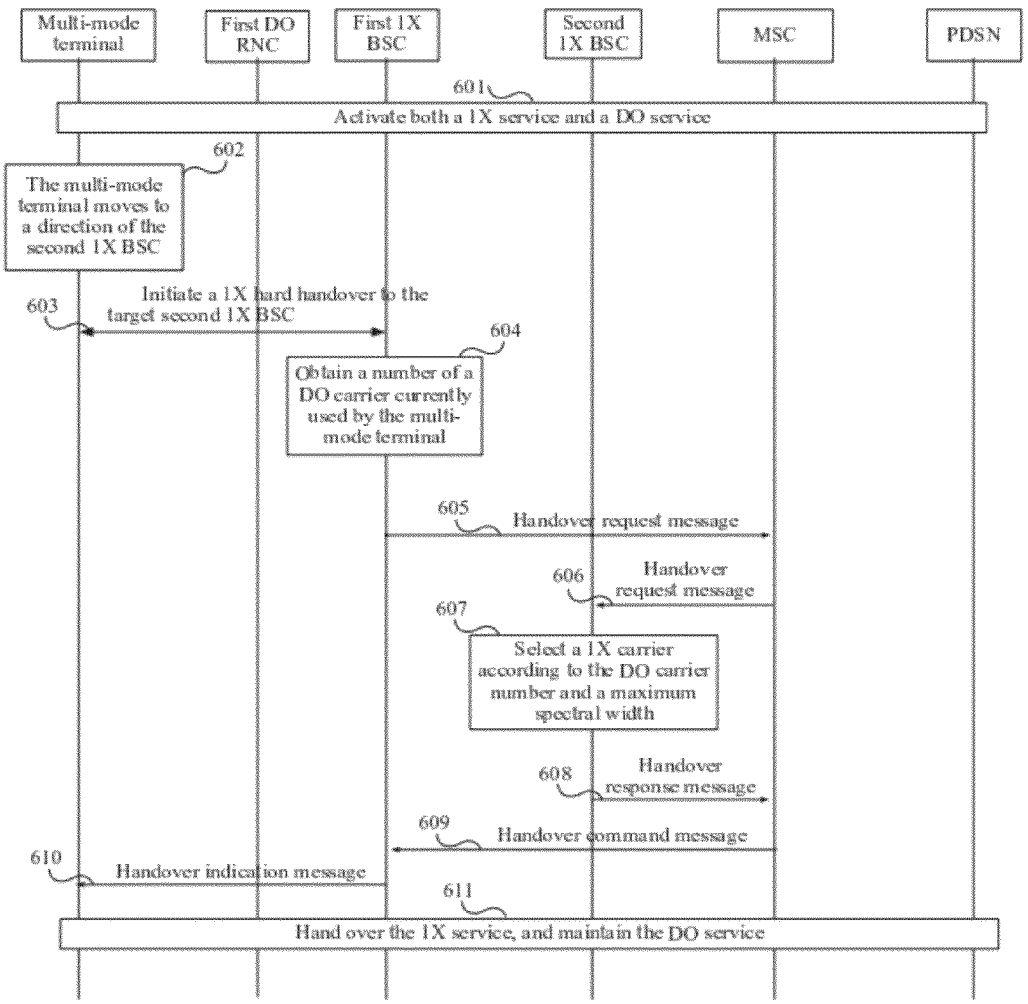
FIG. 6 is a signaling flowchart of a resource allocation method for a multi-mode terminal according to a fourth embodiment of the present invention.

FIG. 6 is a signaling flowchart of a resource allocation method for a multi-mode terminal according to a fourth embodiment of the present invention. In this embodiment, 1X and DO services are still taken as an example, which is specifically a resource allocation process executed during a cell handover for the 1X service when concurrent 1X and DO services are performed.

Figure 7:
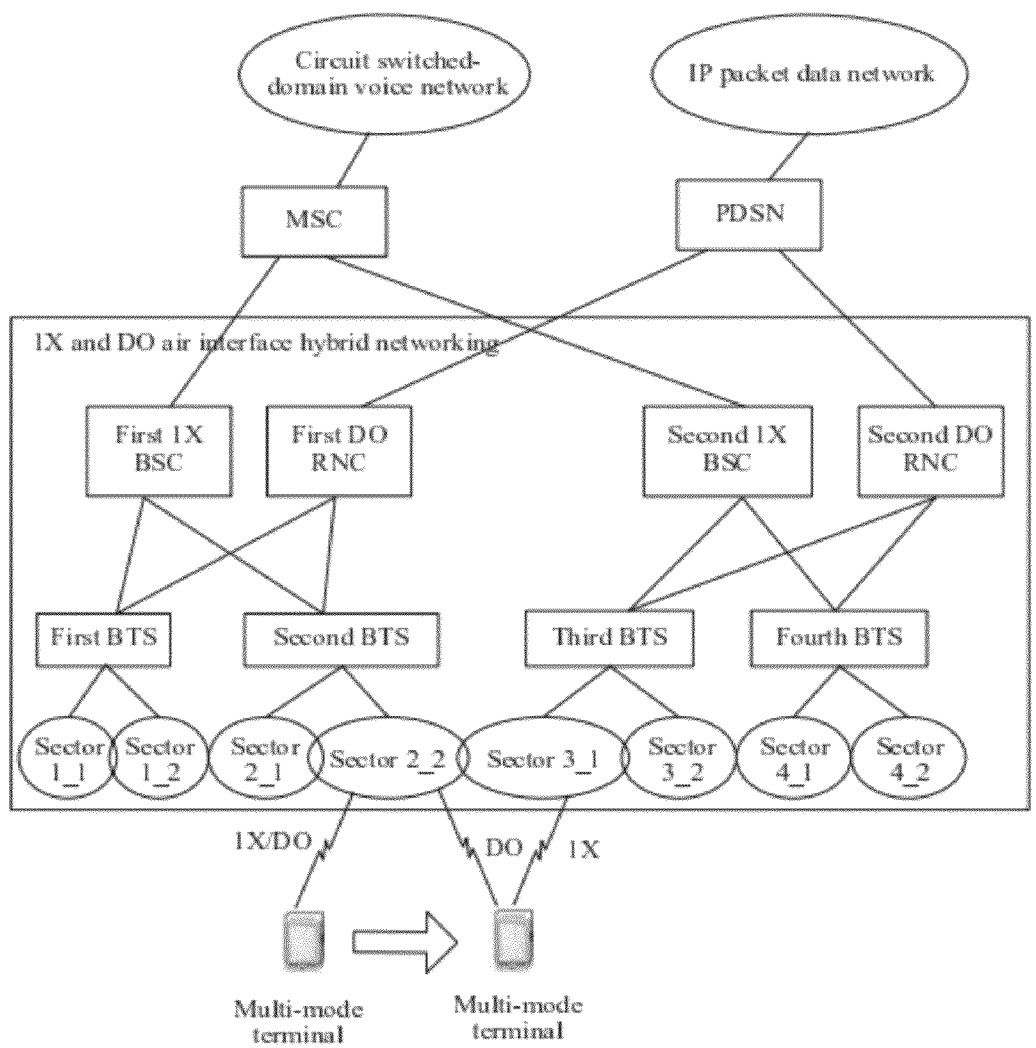
FIG. 7 is a schematic diagram of a network architecture on which the fourth embodiment is based.

FIG. 7 is a schematic diagram of a network architecture on which the fourth embodiment is based. In a hybrid networking architecture where 1X and DO air interfaces are deployed, a BSC and an RNC may deploy a 1X service and a DO service on the same BTS. As shown in FIG. 7, it is assumed that a first 1X BSC, a second 1X BSC, a first DO RNC, and a second DO RNC are included. The first 1X BSC and the first DO RNC may be deployed on the same physical device, and may also be deployed on two independent physical devices, which are similar for the second 1X BSC and the second DO RNC. Two BTSs are managed by the first 1X BSC, the second 1X BSC, the first DO RNC, and the second DO RNC respectively, and each BTS has two sectors. A multi-mode terminal that supports concurrent services performs a 1X service and a DO service on a second BTS at the same time. At this time, a difference between a carrier frequency of the 1X service and a carrier frequency of the DO service is within a range of a maximum spectral width. Then, the multi-mode terminal gradually moves from an area to which the second BTS belongs to an area to which a third BTS belongs.

It is assumed that 10 carriers are deployed in a 2_2 sector of the second BTS, where carriers 1 to 5 are 1X carriers and carriers 6 to 10 are DO carriers; and 1X carriers used by the second BTS are managed by the first 1X BSC, and DO carriers used by the second BTS are managed by the first DO RNC. 10 carriers are deployed in a 3_1 sector of a third BTS, where carriers 1 to 5 are 1X carriers and carriers 6 to 10 are DO carriers. 1X carriers used by the third BTS are managed by the second 1X BSC, and DO carriers used by the third BTS are managed by the second DO RNC. During a movement process, as a radio signal of the third BTS grows intense, a cell handover may occur. It is assumed that a handover of the 1X service occurs first, that is, the 1X service of the multi-mode terminal is to be handed over to the third BTS. At this time, however, the DO service of the multi-mode terminal is still under control of the second BTS. Then a method that includes this handover process includes the following steps:

Step 601: A multi-mode terminal that supports concurrent services performs a 1X service and a DO service simultaneously on a carrier 2 and a carrier 8 in the 2_2 sector, where the carrier 2 in the 2_2 sector is managed by the first 1X BSC, and the carrier 8 in the 2_2 sector is managed by the first DO RNC.

Step 602: The multi-mode terminal moves from the first 1X BSC to a direction of the second 1X BSC. During a movement process, a signal of the carrier 2 on the 2_2 sector, which is received by the multi-mode terminal, gradually fades out, and a radio signal of a carrier used by a target third BTS grows intense.

Step 603: During a movement process of the multi-mode terminal, the first 1X BSC decides to initiate a 1X hard handover to a target second 1X BSC according to a certain determination rule, for example, according to information, such as signal intensity and a round trip delay (Round Trip Delay, RTD for short), where the information is reported by the multi-mode terminal.

Step 604: The first 1X BSC obtains a number of a DO carrier currently used by the multi-mode terminal.

Multiple specific obtaining forms are available:

The first 1X BSC may obtain a number of a DO carrier by transmitting an air interface message with the multi-mode terminal, where the DO carrier is currently used by the multi-mode terminal. A manner for transmitting the air interface message may be that the first 1X BSC sends a query request for a radio resource of a second network technology type to the multi-mode terminal to query information about the currently used DO carrier, and the multi-mode terminal returns a query response for the radio resource of the second network technology type to the first 1X BSC, where the number of the DO carrier currently used by the multi-mode terminal is included;

or, it may also be that the multi-mode terminal actively reports current radio resource information to the first 1X BSC, where the current radio resource information carries information about the currently used DO carrier;

or, the first 1X BSC may send a query request for a radio resource of a second network technology type to the first DO RNC according to a unique identity of the multi-mode terminal, such as an international mobile subscriber identifier (International Mobile Subscriber Identifier, IMSI for short), and receive a query response for the radio resource of the second network technology type, where the query response for the radio resource of the second network technology type is returned by the first DO RNC and includes the number of the DO carrier currently used by the multi-mode terminal.

Step 605: After obtaining the number of the DO carrier currently used by the multi-mode terminal, the first 1X BSC sends a handover request message to an MSC, where the handover request message carries a target sector of a handover, the number of the DO carrier currently used by the multi-mode terminal, and a maximum spectral width supported by the multi-mode terminal.

Step 606: After deciding to allow a handover, the MSC sends a handover request message to the second 1X BSC, where the handover request message carries the target sector of the handover, the number of the DO carrier currently used by the multi-mode terminal, and the maximum spectral width supported by the multi-mode terminal; and the second 1X BSC serves as a control network element of a first network technology type, a received handover request message is a trigger condition for allocating a 1X radio resource for the multi-mode terminal, and DO radio resource information may be obtained by parsing the handover request message.

Or, it may be directly obtained by the second 1X BSC after handover from the multi-mode terminal or the first DO RNC.

Step 607: After receiving the handover request message, the second 1X BSC selects one 1X carrier in the target sector of the handover, for example, a 3__1 sector, according to the number of the DO carrier and the maximum spectral width, as a target carrier of the handover. Specifically, the second 1X BSC needs to ensure that a difference between a frequency of the selected 1X carrier and a frequency of the DO carrier currently used by the multi-mode terminal is within a range of the maximum spectral width. Then, the second 1X BSC selects to allocate a 1X radio resource on the carrier. It is assumed that that a carrier 3 is selected.

Step 608: The second 1X BSC sends a handover response message to the MSC, where the handover response message carries a 1X radio resource that is allocated to the carrier 3 of the 3__1 sector.

Step 609: After receiving the handover response message, the MSC sends a handover command message to the first 1X BSC, where the message carries the 1X radio resource that is allocated to the carrier 3 of the 3__1 sector that is a target sector of the handover.

Step 610: After receiving the handover command message, the first 1X BSC delivers a handover indication message to the multi-mode terminal, where the message carries the 1X radio resource that is allocated to the carrier 3 of the target 3__1 sector that is the target sector of the handover.

Step 611: After the multi-mode terminal receives the handover indication message, a 1X target of the handover is the carrier 3, a DO service is currently performed on the carrier 8, and a difference between frequencies satisfies a requirement of the maximum spectral width. Then concurrent 1X and DO services may be performed, where the multi-mode terminal switches to the carrier 3 in the 3__1 sector to perform the 1X service while maintaining the DO service.

In the preceding technical solution, in a handover process, after DO carrier information is considered, a 1X carrier radio resource is allocated, so that a case where a difference between a frequency of a 1X carrier and a frequency of a DO carrier exceeds the maximum spectral width can be avoided, thereby avoiding a case where the multi-mode terminal performs a 1X service handover according to a set rule, for example, according to a voice service priority rule, and interrupts the DO service at the same time, and finally avoiding failures of concurrent services.

Therefore, with the technical solution in this embodiment, radio resource relevance between services of different network technology types is established in a resource allocation process, so that when a multi-mode terminal that supports concurrency performs a 1X service and a DO service, interruption of the 1X service or the DO service cannot be caused by a hard handover between 1X BSCs, so that the multi-mode terminal may continue to maintain concurrent 1X and DO services before and after the handover. Therefore, a resource conflict during a 1X service handover across BSCs can be avoided, and probability for realizing concurrent services of the multi-mode terminal can be improved.

The number of the DO carrier currently used by the multi-mode terminal is not limited to be carried in the handover request message forwarded by the MSC, where the number of the DO carrier currently used by the multi-mode terminal is obtained by the second 1X BSC. The BSC and the MSC may execute a regular cell handover procedure, and when the first 1X BSC obtains information about a radio resource that is for a service of a second network technology type and currently used by the multi-mode terminal, a pre-handover request message is directly sent to the first 1X BSC to carry information, such as information about the radio resource for the service of the second network technology type and the maximum spectral width. That is, after the step 604, a step that the first 1X BSC sends a pre-handover request message to the second 1X BSC may be added. The pre-handover request message carries the number of the DO carrier currently used by the multi-mode terminal and the maximum spectral width. Then, the handover request message forwarded in steps 605 and 606 only needs to include regular information such as a target sector.

Embodiment 5

Figure 8:
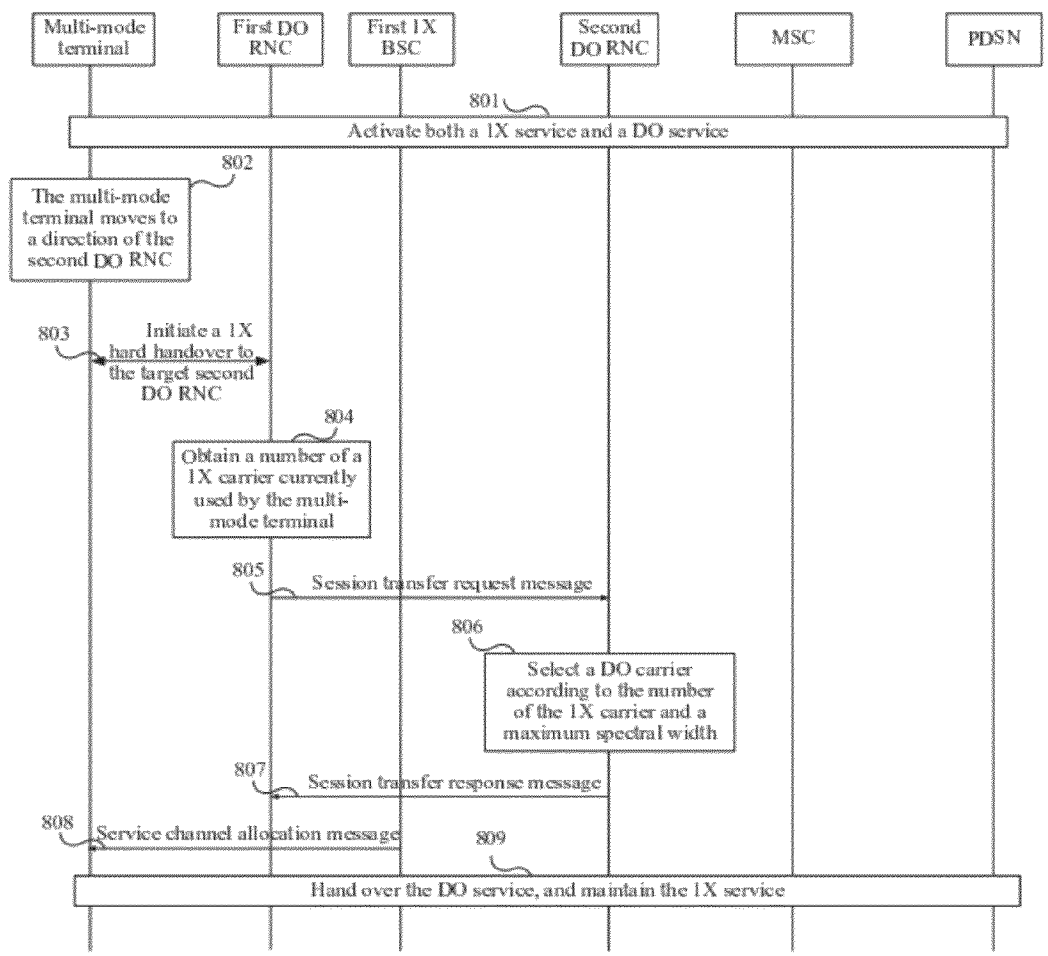
FIG. 8 is a signaling flowchart of a resource allocation method for a multi-mode terminal according to a fifth embodiment of the present invention.
Figure 9:
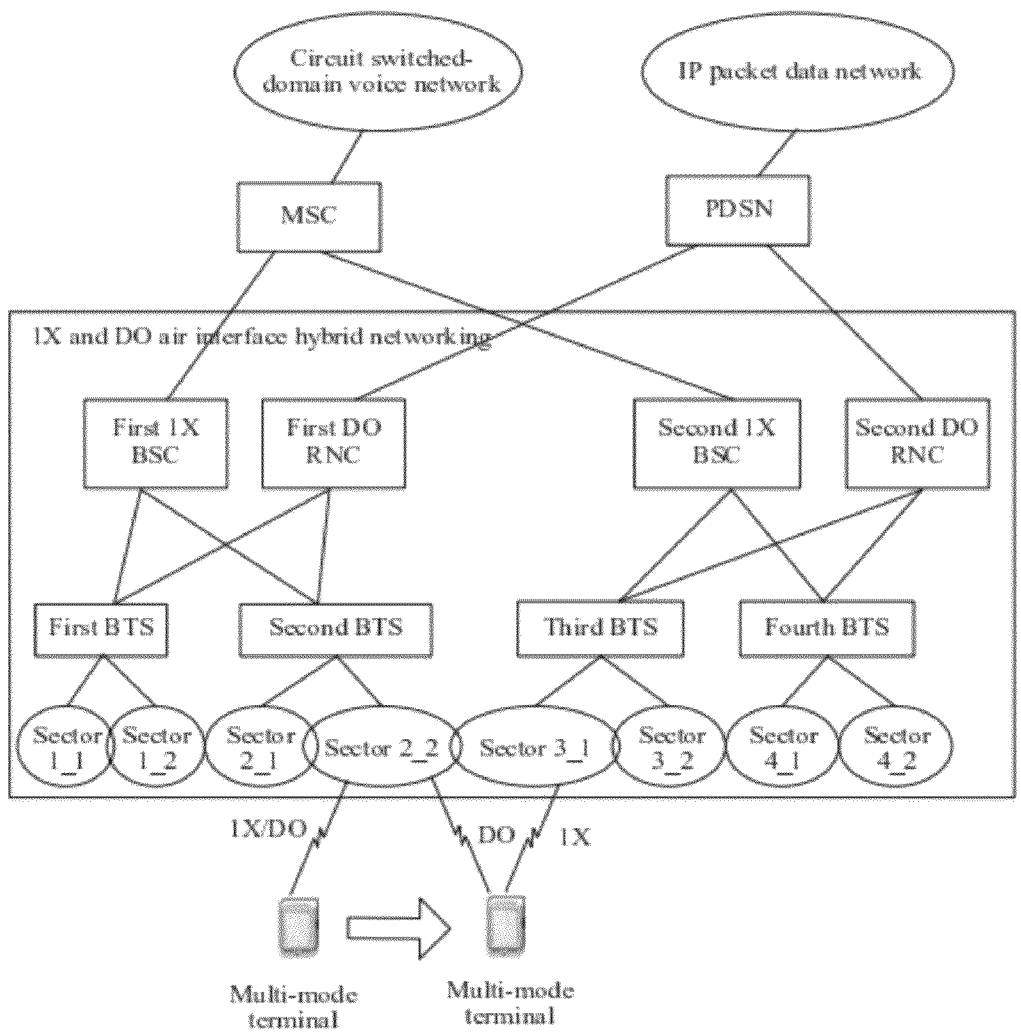
FIG. 9 is a schematic diagram of a network architecture on which the fifth embodiment is based.

FIG. 8 is a signaling flowchart of a resource allocation method for a multi-mode terminal according to a fifth embodiment of the present invention. In this embodiment, 1X and DO services proposed in the fourth embodiment are still taken as an example, specifically, which is a case where a radio resource is allocated during execution of a DO service handover. FIG. 9 is a schematic diagram of a network architecture on which the fifth embodiment is based. It is similar to the case described in the fourth embodiment, however, a difference is that: During a movement process, a DO service is handed over first, and a 1X service is still under control of a second BTS. Specifically, the following steps are included:

Step 801: A multi-mode terminal that supports concurrent services performs a 1X service and a DO service simultaneously on a carrier 2 and a carrier 8 in a 2_2 sector.

Step 802: The multi-mode terminal moves from a first DO RNC to a direction of a second DO RNC. During a movement process, a signal of the carrier 8 on the 2_2 sector, which is received by the multi-mode terminal, gradually fades out, and a radio signal of a carrier used by a target third BTS grows intense.

Step 803: During a movement process of the multi-mode terminal, the first DO RNC decides to initiate a DO hard handover to a target second DO RNC according to a certain determination rule, for example, according to information, such as signal intensity and a RTD, where the information is reported by the multi-mode terminal.

Step 804: The first DO RNC obtains a number of a 1X carrier currently used by the multi-mode terminal.

Being similar to the preceding embodiment, the first DO RNC may obtain a number of a 1X carrier in multiple manners:

The first DO RNC obtains the number of the 1X carrier by transmitting an air interface message with the multi-mode terminal. A manner for transmitting the air interface message may include: The first DO RNC sends a query request for a radio resource of a second network technology type to the multi-mode terminal to query information about the currently used 1X carrier, and the multi-mode terminal returns a query response for the radio resource of the second network technology type to the first DO RNC, where the number of the 1X carrier currently used by the multi-mode terminal is included;

or, it may also be that the multi-mode terminal actively reports current radio resource information to the first DO RNC, where the current radio resource information carries information about the 1X carrier currently used by the multi-mode terminal;

or, the first DO RNC may send a query request for a radio resource of a second network technology type to the first 1X BSC according to a unique identity of the multi-mode terminal, and receive a query response for the radio resource of the second network technology type, where the query response for the radio resource of the second network technology type is returned by the first 1X BSC and includes the number of the 1X carrier currently used by the multi-mode terminal.

Step 805: After obtaining the number of the 1X carrier currently used by the multi-mode terminal, the first DO RNC sends a session transfer request message to the target second DO RNC, where the request message carries a target carrier of a handover. The first DO RNC may determine, according to information about a current radio environment of the multi-mode terminal, the target carrier of the handover, the number of the 1X carrier currently used by the multi-mode terminal, and a maximum spectral width supported by the multi-mode terminal.

Step 806: After receiving the session transfer request message, the second DO RNC hands over a target sector. The second DO RNC may determine a target sector of the handover according to the target carrier of the handover, where the target carrier of the handover is carried in the session transfer request message, for example, selects one DO carrier in a 3_1 sector as the target carrier of the handover according to the number of the 1X carrier and the maximum spectral width. Specifically, the second DO RNC needs to ensure that a difference between a frequency of a selected DO carrier and a frequency of the 1X carrier currently used by the multi-mode terminal is within a range of the maximum spectral width. Then, the second DO RNC selects to allocate a DO radio resource on the carrier. It is assumed that a carrier 7 is selected.

Step 807: The second DO RNC sends a session transfer response message to the first DO RNC, where the message carries a DO radio resource that is allocated on the carrier 7 in the 3_1 sector.

Step 808: After receiving the session transfer response message, the first DO RNC sends a service channel allocation message to the multi-mode terminal, where the message carries the DO radio resource that is allocated on the carrier 7 in the target 3_1 sector of the handover.

Step 809: After the multi-mode terminal receives the service channel allocation message, a DO target carrier of the handover is the carrier 7, a 1X service is currently performed on the carrier 2, and a difference between frequencies satisfies a requirement of the maximum spectral width. Then concurrent 1X and DO services may be performed, where the multi-mode terminal switches to the carrier 7 in the 3_1 sector to perform the DO service while maintaining the 1X service.

In the technical solution in this embodiment, in a handover process, after 1X carrier information is considered, a DO carrier radio resource is allocated, so that a case where a difference between a frequency of a 1X carrier and a frequency of a DO carrier exceeds the maximum spectral width can be avoided, thereby avoiding a case where the multi-mode terminal continues to maintain the 1X service according to a set rule, for example, according to a voice service priority rule, and interrupts the DO service at the same time, and finally avoiding failures of concurrent services.

Therefore, with the technical solution in this embodiment, radio resource relevance between services of different network technology types is established in a resource allocation process, so that when a multi-mode terminal that supports concurrency performs a 1X service and a DO service, interruption of the 1X service or the DO service cannot be caused by a hard handover between DO RNCs, so that the multi-mode terminal may continue to maintain concurrent 1X and DO services before and after the handover. Therefore, a resource conflict during a DO service handover across RNCs can be avoided, and probability for realizing concurrent services of the multi-mode terminal can be improved.

Embodiment 6

Figure 10:
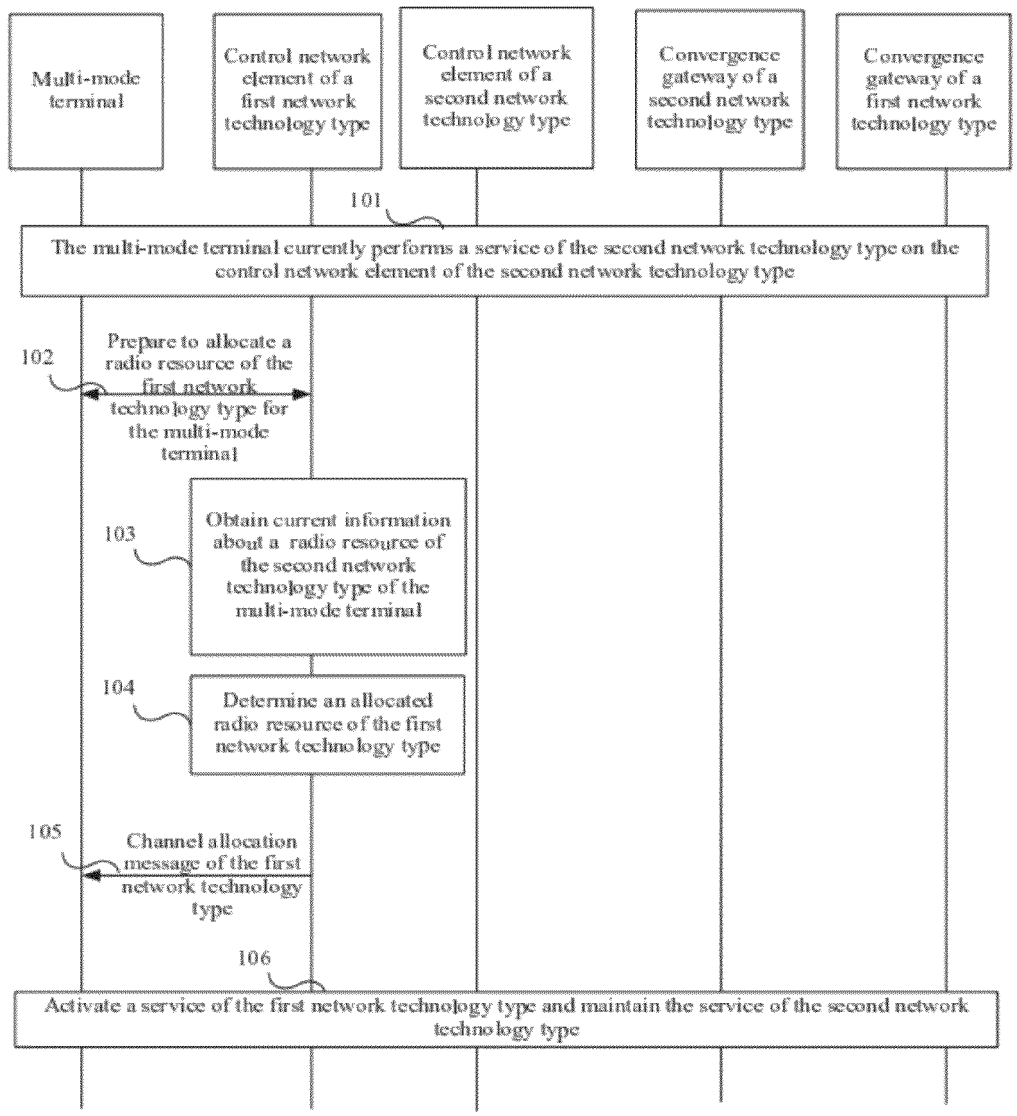
FIG. 10 is a signaling flowchart of a resource allocation method for a multi-mode terminal according to a sixth embodiment of the present invention.

FIG. 10 is a signaling flowchart of a resource allocation method for a multi-mode terminal according to a sixth embodiment of the present invention. In the preceding embodiment, services provided by 1X and DO are taken as an example for description. In this embodiment, an execution method applicable to services of any two network technology types is generally introduced. It is assumed that a first network technology type is included, where corresponding network elements include a control network element of the first network technology type and a convergence gateway of the first network technology type, and a second network technology type is further included, where corresponding network elements include a control network element of the second network technology type and a convergence gateway of the second network technology type. Similarly, a third network technology type and a fourth network technology type may further be included. Specific modes may be any combination of the following: GSM, UMTS, LTE, 1X, DO, TDS-CDMA, wireless local area network (Wireless Local Area Network, WLAN for short), and worldwide interoperability for microwave (Worldwide Interoperability for Microwave, Wimax for short). A corresponding network element may be a control network element in an access network, for example, a corresponding network element in GSM is a GSM BSC, a corresponding network element in UMTS and TDS-CDMA is an RNC, a corresponding network element in LTE is an evolved node base (evolved Node Base, eNB for short), a corresponding network element in 1X is an 1X BSC, a corresponding network element in DO is an DO RNC, a corresponding network element in Wimax is an BS, and a corresponding network element in WLAN is an access point (Access Point, AP for short) base station. A convergence gateway in each network may be a convergence gateway control entity of a core network. For example, a corresponding convergence gateway in GSM, 1X, UMTS, and TDS-CDMA is an MSC, a corresponding convergence gateway in LTE is a mobility management entity (Mobility Management Entity, MME for short), a corresponding convergence gateway in DO is a PDSN, a corresponding convergence gateway in Wimax is an access service network gateway (Access Service network Gateway, ASN GW for short), and a corresponding convergence gateway in WLAN is an Ethernet switch (Ethernet Switch).

When establishment of a service of a first network technology type is initiated in the case that a service of a second network technology type is executed, A procedure of resource allocation that is performed by the control network element of the first network technology type includes the following steps:

Step 101: A multi-mode terminal currently performs the service of the second network technology type on the control network element of the second network technology type, where the service of the second network technology type is performed on a second carrier. At the same time, the multi-mode terminal may perform the service of the first network technology type on the control network element of the first network technology type, where frequencies of a carrier of the first network technology type and a carrier of the second network technology type are within a range of a maximum spectral width, and may also not perform the service of the first network technology type.

Step 102: The control network element of the first network technology type identifies a trigger condition for allocating a radio resource of the first network technology type for the multi-mode terminal, and prepares to allocate the radio resource of the first network technology type for the multi-mode terminal. The trigger condition may be that the multi-mode terminal actively sends a request for establishing a service of the first network technology type to the control network element of the first network technology type, or the control network element of the first network technology type actively initiates establishment of the service of the first network technology type.

Step 103: The control network element of the first network technology type obtains information about a radio resource of the second network technology type, where the radio resource of the second network technology type is allocated to the service of the second network technology type and currently used by the multi-mode terminal, for example, a number of a second carrier.

Manners that the control network element of the first network technology type obtains a number of a second carrier currently used by the multi-mode terminal include: (1) The control network element of the first network technology type obtains the number of the second carrier by transmitting an air interface message with the multi-mode terminal, where the second carrier is currently used by the multi-mode terminal. A manner for transmitting the air interface message may include: The control network element of the first network technology type sends a query request for the radio resource of the second network technology type to the multi-mode terminal to query the number of the second carrier currently used by the multi-mode terminal, and the multi-mode terminal returns a query response for the radio resource of the second network technology type to the control network element of the first network technology type, where the response includes the number of the second carrier currently used by the multi-mode terminal; or, the multi-mode terminal may actively report current radio resource information to the control network element of the first network technology type, which the current radio resource information carries information about the currently used second carrier; and (2) The control network element of the first network technology type queries, according to a unique identity of the multi-mode terminal, the control network element of the second network technology type for the number of the second carrier currently used by the multi-mode terminal.

Step 104: After obtaining the information about the radio resource of the second network technology type, where the radio resource of the second network technology type is currently used by the multi-mode terminal, the control network element of the first network technology type determines, according to this information, the radio resource of the first network technology type, where the radio resource of the first network technology type is allocated to the multi-mode terminal. It should be ensured that an allocated radio resource of the second network technology type and the radio resource of the first network technology type satisfy a set requirement, for example, satisfy a requirement of the maximum spectral width.

Step 105: The control network element of the first network technology type delivers a channel allocation message of the first network technology type to the multi-mode terminal, where an allocated radio resource of the first network technology type is carried.

Step 106: After receiving the channel allocation message, the multi-mode terminal performs activation of the service of the first network technology type, and maintains the service of the second network technology type at the same time.

With the technical solution in this embodiment, relevance between concurrent services can be established when a radio resource is allocated, and for a multi-mode terminal that supports concurrency of a service of a first network technology type and a service of a second network technology type, interruption of the service of the first network technology type or the service of the second network technology type cannot be caused by allocation of a carrier resource of the first network technology type, so that reliability of realizing concurrent services by the multi-mode terminal is improved.

Embodiment 7

Figure 11:
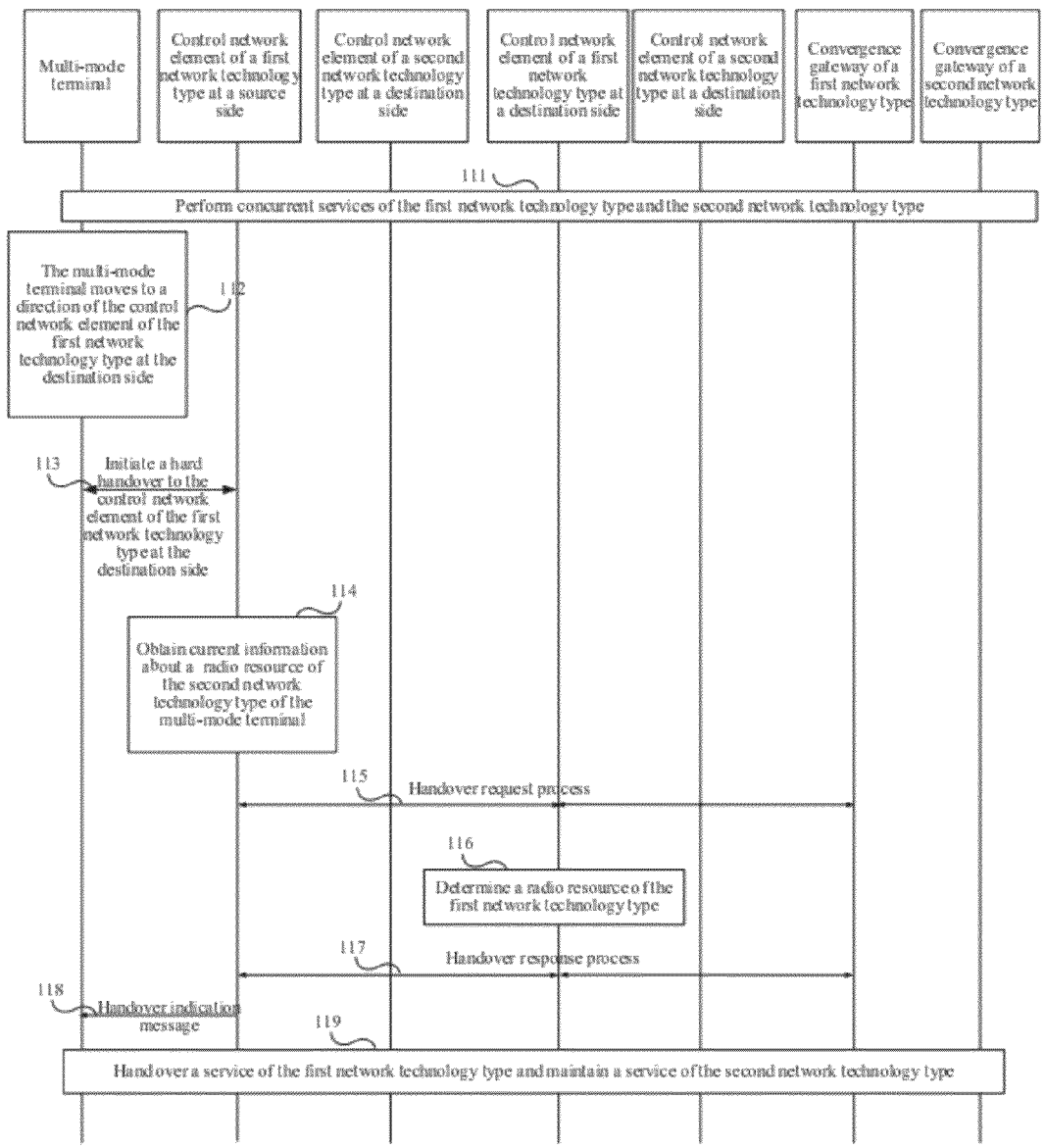
FIG. 11 is a signaling flowchart of a resource allocation method for a multi-mode terminal according to a seventh embodiment of the present invention.

FIG. 11 is a signaling flowchart of a resource allocation method for a multi-mode terminal according to a seventh embodiment of the present invention. In this embodiment, an implementation manner of the resource allocation method in the present invention during a service handover is generally described. For various network technology types and corresponding network element, reference may be made to the description in the sixth embodiment. In addition, specifically, a control network element of a network technology type further includes a control network element of a network technology type at a source side and a control network element of a network technology type at a destination side.

Step 111: A multi-mode terminal performs concurrent services of a first network technology type and a second network technology type respectively on a control network element of the first network technology type at a source side and a control network element of the second network technology type at the source side.

Step 112: The multi-mode terminal moves to a direction of a control network element of the first network technology type at a destination side. At this time, a radio signal of the control network element of the first network technology type at the source side gradually fades out, and a radio signal of the control network element of the first network technology type at the destination side grows intense.

Step 113: During a movement process of the multi-mode terminal, the control network element of the first network technology type at the source side decides to initiate a hard handover of the first network technology type to the control network element of the first network technology type at the destination side according to a set determination rule, for example according to information, such as signal intensity and a RTD, where the information is reported by the multi-mode terminal.

Step 114: The control network element of the first network technology type at the source side obtains information about a radio resource of the second network technology type, where the radio resource of the second network technology type is currently used by the multi-mode terminal.

Obtaining manners may include: The control network element of the first network technology type at the source side obtains the information about the radio resource of the second network technology type by transmitting an air interface message with the multi-mode terminal, where the radio resource of the second network technology type is currently used by the multi-mode terminal. A manner for transmitting the air interface message may include: The control network element of the first network technology type at the source side sends a query request for the radio resource of the second network technology type to the multi-mode terminal, and the multi-mode terminal returns a query response for the radio resource of the second network technology type to the control network element of the first network technology type at the source side, where the information about the radio resource of the second network technology type is included, where the radio resource of the second network technology type is currently used by the multi-mode terminal; or, the multi-mode terminal actively reports current radio resource information to the control network element of the first network technology type at the source side, and the control network element of the first network technology type at the source side may further query, according to a unique identity of the multi-mode terminal, the control network element of the second network technology type for the information about the radio resource of the second network technology type, where the radio resource of the second network technology type is currently used by the multi-mode terminal.

Step 115: After obtaining the information about the radio resource of the second network technology type, where the radio resource of the second network technology type is currently used by the multi-mode terminal, the control network element of the first network technology type at the source side sends a handover request message to the control network element of the first network technology type at the destination side. The handover request message may need to pass through a convergence gateway of a network of the first network technology type, and the convergence gateway of the network of the first network technology type sends the handover request message to the control network element of the first network technology type at the destination side. The handover request message carries the information about the radio resource of the second network technology type, where the radio resource of the second network technology type is currently used by the multi-mode terminal, and may further carry a set relevance relationship between radio resources of other network technology types.

Step 116: After obtaining the handover request message, the control network element of the first network technology type at the destination side determines, according to the information about the radio resource of the second network technology type, that the radio resource of the first network technology type satisfies a relevance relationship or a restriction relationship between radio resources of the two network technology types, for example, satisfies a requirement of a maximum spectral width.

Step 117: The control network element of the first network technology type at the destination side sends a handover response message to the control network element of the first network technology type at the source side, where the message carries an allocated radio resource of the first network technology type. The message may need to pass through the convergence gateway of the network of the first network technology type, and the convergence gateway of the network of the first network technology type sends the handover response message to the control network element of the first network technology type at the source side.

Step 118: After receiving the handover response message, the control network element of the first network technology type at the source side delivers a handover indication message to the multi-mode terminal, where the message carries the radio resource of the first network technology type, where the radio resource of the first network technology type is allocated by the control network element of the first network technology type at the destination side.

Step 119: After receiving the handover indication message, the multi-mode terminal performs a handover of a service of the first network technology type, and maintains a service of the second network technology type at the same time, thereby realizing the concurrent services of the first network technology type and the second network technology type.

With the technical solution in this embodiment, relevance between concurrent services can be established when a radio resource is allocated, and when a multi-mode terminal that supports concurrency performs a service of a first network technology type and a service of a second network technology type, interruption of the service of the first network technology type or the service of the second network technology type cannot be caused by a handover of the first network technology type or the second network technology type, so that reliability of realizing concurrent services by the multi-mode terminal is improved.

Embodiment 8

Figure 12:
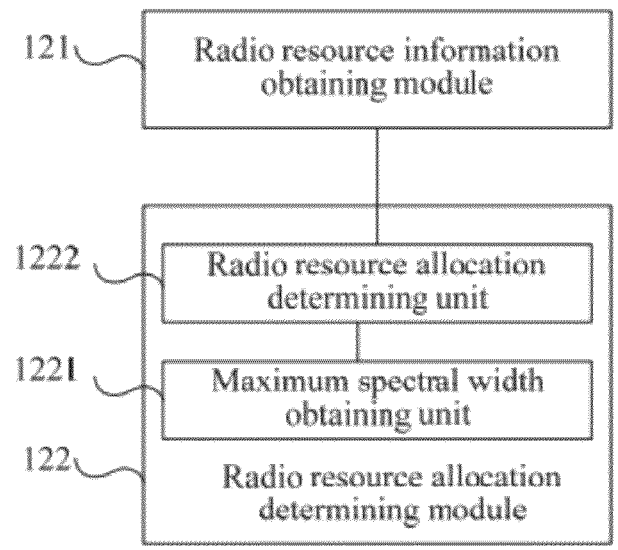
FIG. 12 is a schematic structural diagram of a resource allocation apparatus for a multi-mode terminal according to an eighth embodiment of the present invention.

FIG. 12 is a schematic structural diagram of a resource allocation apparatus for a multi-mode terminal according to an eighth embodiment of the present invention. This apparatus may be integrated in a control network element of a first network technology type. A control network element may be different in systems of different network technology types. For example, for a 1X system, a control network element may be a BSC; and for a DO system, a control network element may be an RNC. This apparatus includes: a radio resource information obtaining module 121 and a radio resource allocation determining module 122. Where, the radio resource information obtaining module 121 is configured to obtain information about a radio resource of a second network technology type, where the radio resource of the second network technology type is used by the multi-mode terminal, and the information about the radio resource of the second network technology type indicates a carrier frequency; and the radio resource allocation determining module 122 is configured to: according to the carrier frequency indicated by the information about the radio resource of the second network technology type and according to an obtained maximum spectral width between a service of the first network technology type and a service of the second network technology type, determine that a carrier frequency allocated to the multi-mode terminal serves as a radio resource of the first network technology type, where a difference value between a carrier frequency of the radio resource of the first network technology type and the carrier frequency indicated by the information about the radio resource of the second network technology type is within a range of the maximum spectral width.

The technical solution in this embodiment may be applied to solve a conflict between carriers of radio resources of different network technology types. Then, the information about the radio resource of the second network technology type may be a carrier number that indicates a carrier frequency. The radio resource allocation determining module 122 may specifically include: a maximum spectral width obtaining unit 1221 and a radio resource allocation determining unit 1222. The maximum spectral width obtaining unit 1221 is configured to obtain a maximum spectral width between the service of the first network technology type and the service of the second network technology type; and the radio resource allocation determining unit 1222 is configured to, according to the carrier frequency indicated by the carrier number, and according to the maximum spectral width, determine that the carrier frequency allocated to the multi-mode terminal serves as the radio resource of the first network technology type, where the difference value between the carrier frequency of the radio resource of the first network technology type and the carrier frequency indicated by the information about the radio resource of the second network technology type is within the range of the maximum spectral width.

By using the preceding technical solution, relevance among various network technology types is established when a system at a network side allocates a radio resource for a multi-mode terminal, so that failures of concurrent services, which are caused by a radio resource conflict, can be avoided, and therefore, reliability for realizing the concurrent services can be improved.

Embodiment 9

Figure 13:
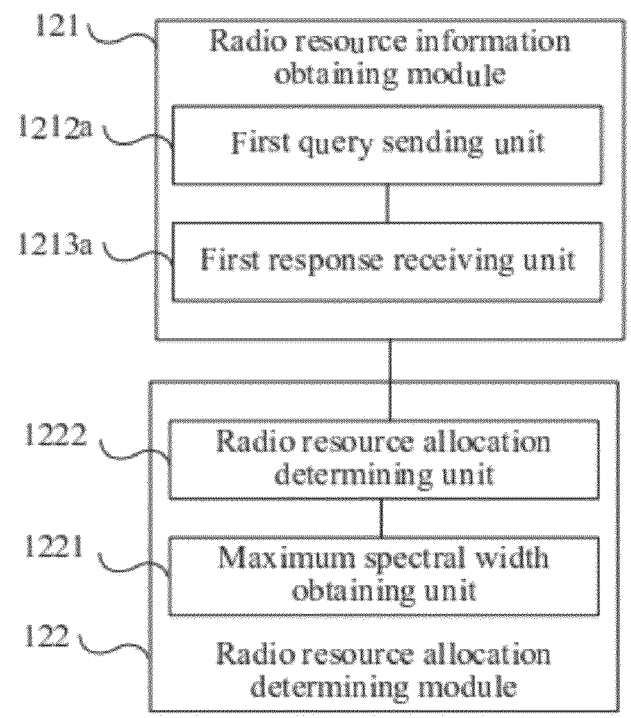
FIG. 13 is a schematic structural diagram of a resource allocation apparatus for a multi-mode terminal according to a ninth embodiment of the present invention.

FIG. 13 is a schematic structural diagram of a resource allocation apparatus for a multi-mode terminal according to a ninth embodiment of the present invention. This embodiment may be based on the eighth embodiment, and a radio resource information obtaining module 121 specifically includes: a first query sending unit 1212a and a first response receiving unit 1213a. The first query sending unit 1212a is configured to send a query request for a radio resource of a second network technology type to the multi-mode terminal; and the first response receiving unit 1213a is configured to receive information about the radio resource of the second network technology type, where the information about the radio resource of the second network technology type is sent by the multi-mode terminal.

The technical solution in this embodiment is a specific form of obtaining the information about the radio resource of the second network technology type, where a mobile terminal is actively queried to obtain information about a radio resource currently used by the mobile terminal, and the information may be obtained in real time when required, thereby avoiding excessively occupying a transmission resource.

Embodiment 10

Figure 14:
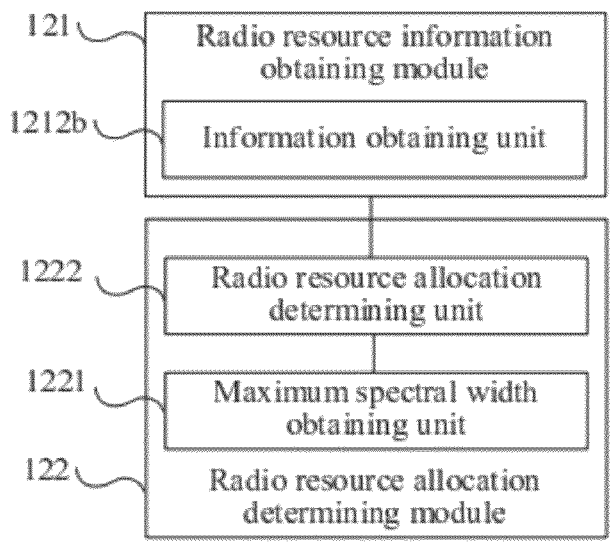
FIG. 14 is a schematic structural diagram of a resource allocation apparatus for a multi-mode terminal according to a tenth embodiment of the present invention.

FIG. 14 is a schematic structural diagram of a resource allocation apparatus for a multi-mode terminal according to a tenth embodiment of the present invention. This embodiment may be based on the eighth embodiment, and a radio resource information obtaining module 121 specifically includes: an information obtaining unit 1212b. The information obtaining unit 1212b is configured to obtain, from current radio resource information sent by the multi-mode terminal, information about a radio resource of a second network technology type, where the radio resource of the second network technology type is used by the multi-mode terminal.

The technical solution in this embodiment is another specific form of obtaining the information about the radio resource of the second network technology type, where a mobile terminal reports information about a radio resource currently used by the mobile terminal, so that it may ensure that information is obtained in real time and accurately.

Embodiment 11

Figure 15:
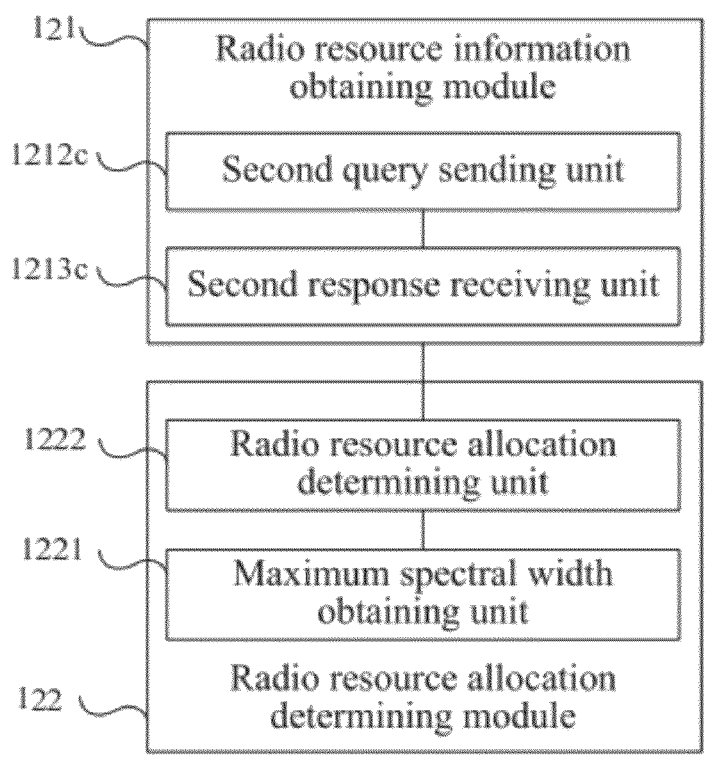
FIG. 15 is a schematic structural diagram of a resource allocation apparatus for a multi-mode terminal according to an eleventh embodiment of the present invention.

FIG. 15 is a schematic structural diagram of a resource allocation apparatus for a multi-mode terminal according to an eleventh embodiment of the present invention. This embodiment may be based on the eighth embodiment, and a radio resource information obtaining module 121 specifically includes: a second query sending unit 1212c and a second response receiving unit 1213c. The second query sending unit 1212c is configured to send a query request for a radio resource of a second network technology type to a control network element of the second network technology type, where the query request for the radio resource of the second network technology type includes an identity of the multi-mode terminal; and the second response receiving unit 1213c is configured to receive information about the radio resource of the second network technology type, where the information about the radio resource of the second network technology type is sent by the control network element of the second network technology type.

The technical solution in this embodiment is another specific form of obtaining the information about the radio resource of the second network technology type, where a network side queries and obtains information about a radio resource currently used by a mobile terminal, which may reduce information amount required for transmission by the mobile terminal and reduce a load of the mobile terminal.

With the technical solution in each of the embodiments of the present invention, the resource allocation method for the multi-mode terminal provided in the embodiments may be executed, corresponding functional modules are provided, and relevance between various network technology types is established when a system at a network side allocates a radio resource for a multi-mode terminal, so that failures of concurrent services, which are caused by a radio resource conflict can be avoided, and reliability of realizing concurrent services can be improved.

It is understandable to those skilled in the art that all or a part of steps in the preceding method embodiments may be accomplished by a program instructing related hardware. The program may be stored in a computer readable storage medium. When the program is executed, the steps in the preceding method embodiments are executed. The storage medium may be any medium capable of storing program codes, such as a ROM, a RAM, a magnetic disk, or a compact disk, and so on.

Finally, it should be noted that the preceding embodiments are only used to describe the technical solutions in the present invention but are not intended to limit the present invention. It is understandable to those skilled in the art that although the present invention is described with reference to the preceding embodiments, modifications may still be made to the technical solutions described in the preceding embodiments, or equivalent replacements may be made to a part of technical features in the technical solutions, however, these modifications or replacements do not make the essence of the corresponding technical solutions depart from the scope of the technical solutions in the embodiments of the present invention.

What is claimed is:

1. A resource allocation method for a multi-mode terminal, the method comprising:
    obtaining, by a control network element of a first network technology type, information about a radio resource of a second network technology type, wherein the radio resource of the second network technology type is used by the multi-mode terminal and the information about the radio resource of the second network technology type indicates a carrier frequency; and
    according to the carrier frequency indicated by the information of the radio resource of the second network technology type and according to a maximum spectral width between a service of the first network technology type and a service of the second network technology type, determining, by the control network element of the first network technology type, that a carrier frequency allocated to the multi-mode terminal serves as a radio resource of the first network technology type, wherein a difference value between a carrier frequency of the radio resource of the first network technology type and the carrier frequency indicated by the information about the radio resource of the second network technology type is within a range of the maximum spectral width.

2. The resource allocation method according to claim 1, wherein obtaining information about the radio resource of a second network technology type comprises:
    sending, by the control network element of the first network technology type, a query request for a radio resource of a second network technology type to the multi-mode terminal; and
    receiving, by the control network element of the first network technology type, information about the radio resource of the second network technology type, wherein the information about the radio resource of the second network technology type is sent by the multi-mode terminal and the radio resource of the second network technology type is used by the multi-mode terminal.

3. The resource allocation method according to claim 1, wherein obtaining information about the radio resource of a second network technology type comprises:
    obtaining information about the radio resource of the second network technology type from current radio resource information sent by the multi-mode terminal, wherein the radio resource of the second network technology type is used by the multi-mode terminal.

4. The resource allocation method according to claim 1, from current radio resource information sent by the multi-mode terminal:
    sending, by the control network element of the first network technology type, a query request for the radio resource of the second network technology type to a control network element of the second network technology type, wherein the query request for the radio resource of the second network technology type comprises an identity of the multi-mode terminal; and
    receiving, by the control network element of the first network technology type, information about the radio resource of the second network technology type, wherein the information about the radio resource of the second network technology type is sent by the control network element of the second network technology type.

5. The resource allocation method according to claim 1, wherein before obtaining information about the radio resource of a second network technology type, the method further comprises:
    receiving, by the control network element of the first network technology type, a request for establishing a service of the first network technology type, wherein the request for establishing the service of the first network technology type is initiated by the multi-mode terminal.

6. The resource allocation method according to claim 1, wherein before obtaining information about the radio resource of a second network technology type, the method further comprises:
    initiating, by the control network element of the first network technology type, establishment of the service of the first network technology type for the multi-mode terminal.

7. The resource allocation method according to claim 1, wherein before obtaining information about the radio resource of a second network technology type, the method further comprises:
    receiving, by the control network element of the first network technology type, a handover request message for the multi-mode terminal.

8. The resource allocation method according to claim 1, wherein obtaining information about the radio resource of a second network technology type comprises:
    receiving, by a control network element of the first network technology type at a destination side from a control network element of the first network technology type at a source side, information about the radio resource of the second network technology type, wherein the information about the radio resource of the second network technology type is comprised in a handover request message or a pre-handover request.

9. A resource allocation apparatus for a multi-mode terminal, the resource allocation apparatus comprising:
    a radio resource information obtaining module, configured to obtain information about a radio resource of a second network technology type, wherein the radio resource of the second network technology type is used by the multi-mode terminal and the information about the radio resource of the second network technology type indicates a carrier frequency; and
    a radio resource allocation determining module, configured to, according to the carrier frequency indicated by the information of the radio resource of the second network technology type and according to an obtained maximum spectral width between a service of a first network technology type and a service of the second network technology type, determine that a carrier frequency allocated to the multi-mode terminal serves as a radio resource of the first network technology type, wherein a difference value between a carrier frequency of the radio resource of the first network technology type and the carrier frequency indicated by information about the radio resource of the second network technology type is within a range of the maximum spectral width.

10. The resource allocation apparatus according to claim 9, wherein the radio resource information obtaining module comprises:
   a first query sending unit, configured to send a query request for the radio resource of the second network technology type to the multi-mode terminal; and
   a first response receiving unit, configured to receive information about the radio resource of the second network technology type, wherein the information about the radio resource of the second network technology type is sent by the multi-mode terminal.

11. The resource allocation apparatus according to claim 9, wherein the radio resource information obtaining module comprises:
   an information obtaining unit, configured to obtain information about the radio resource of the second network technology type from current radio resource information sent by the multi-mode terminal, wherein the radio resource of the second network technology type is used by the multi-mode terminal.

12. The resource allocation apparatus according to claim 9, wherein the radio resource information obtaining module comprises:
   a second query sending unit, configured to send a query request for the radio resource of the second network technology type to a control network element of the second network technology type, wherein the query request for the radio resource of the second network technology type comprises an identity of the multi-mode terminal; and
   a second response receiving unit, configured to receive information about the radio resource of the second network technology type, wherein the information about the radio resource of the second network technology type is sent by the control network element of the second network technology type.

13. A control network element for allocating resource, comprising a processor, wherein the processor is configured to obtain information about a radio resource of a second network technology type, wherein the radio resource of the second network technology type is used by a multi-mode terminal associated with the processor, and the information about the radio resource of the second network technology type indicates a carrier frequency; and
   wherein the processor is configured to, according to the carrier frequency indicated by the information of the radio resource of the second network technology type and an maximum spectral width between a service of a first network technology type and a service of the second network technology type, determine that a carrier frequency allocated to the multi-mode terminal serves as a radio resource of the first network technology type, wherein a difference value between a carrier frequency of the radio resource of the first network technology type and the carrier frequency indicated by information about the radio resource of the second network technology type is within a range of the maximum spectral width.

14. The control network element according to claim 13, wherein the processor is further configured to:
   send a query request for the radio resource of the second network technology type to the multi-mode terminal; and
   receive information about the radio resource of the second network technology type, wherein the information about the radio resource of the second network technology type is sent by the multi-mode terminal.

15. The control network element according to claim 13, wherein the processor is further configured to obtain, from current radio resource information sent by the multi-mode terminal, information about the radio resource of the second network technology type, wherein the radio resource of the second network technology type is used by the multi-mode terminal.

16. The control network element according to claim 13, wherein the processor is further configured to:
   send a query request for the radio resource of the second network technology type to a control network element of the second network technology type, wherein the query request for the radio resource of the second network technology type comprises an identity of the multi-mode terminal; and
   receive information about the radio resource of the second network technology type, wherein the information about the radio resource of the second network technology type is sent by the control network element of the second network technology type.

17. The control network element according to claim 13, wherein the control network element is a Base Station Controller (BSC).

18. The control network element according to claim 13, wherein the control network element is a Radio Network Controller (RNC).

* * * * *